United States Patent
Neumann

Patent Number: 5,956,660
Date of Patent: Sep. 21, 1999

[54] PERSONAL INERTIAL SURVEYING SYSTEM

[75] Inventor: Leopold Neumann, Lexington, Mass.

[73] Assignee: Analogic Corporation, Peabody, Mass.

[21] Appl. No.: 08/899,294

[22] Filed: Jul. 23, 1997

[51] Int. Cl.$^6$ .............. G01C 25/00; G01C 19/00
[52] U.S. Cl. .............. 702/150; 702/87; 702/94; 701/207; 701/220; 701/221
[58] Field of Search .............. 702/150, 94, 141, 702/87, 92, 93, 95; 701/200, 207, 213, 217, 220, 221, 300; 73/178 R, 1.38, 1.77, 1.78, 503.3; 324/330; 340/870.05, 988; 33/275 G, 324

[56] References Cited

U.S. PATENT DOCUMENTS

| | | | |
|---|---|---|---|
| 4,033,045 | 7/1977 | Wing | 33/275 G |
| 4,060,718 | 11/1977 | Huddle | 364/421 |
| 4,437,243 | 3/1984 | Brown | 33/302 |
| 4,515,221 | 5/1985 | Van Der Lely | 172/32 |
| 4,559,713 | 12/1985 | Ott et al. | 33/302 |
| 4,577,414 | 3/1986 | Migliori et al. | 33/363 K |
| 4,768,152 | 8/1988 | Egli et al. | 364/422 |
| 4,812,977 | 3/1989 | Hulsing, II | 364/422 |
| 4,833,787 | 5/1989 | Van Steenwyk | 33/302 |
| 4,858,329 | 8/1989 | Manor | 33/775 |
| 4,977,509 | 12/1990 | Pitchford et al. | 364/449 |
| 4,987,684 | 1/1991 | Andreas et al. | 33/304 |
| 5,050,087 | 9/1991 | Walrath et al. | 364/434 |
| 5,060,392 | 10/1991 | Grasso | 33/324 |
| 5,086,568 | 2/1992 | McKeown et al. | 33/275 G |
| 5,184,304 | 2/1993 | Huddle | 364/453 |
| 5,331,578 | 7/1994 | Stieler | 364/571.01 |
| 5,339,684 | 8/1994 | Jircitano et al. | 73/178 R |
| 5,422,816 | 6/1995 | Sprague et al. | 364/449 |
| 5,434,789 | 7/1995 | Fraker et al. | 364/460 |
| 5,438,518 | 8/1995 | Bianco et al. | 364/460 |
| 5,440,484 | 8/1995 | Kao | 364/424.01 |
| 5,479,161 | 12/1995 | Keyes et al. | 340/870.04 |
| 5,488,559 | 1/1996 | Seymour | 364/449 |
| 5,507,485 | 4/1996 | Fisher | 273/32 |
| 5,583,776 | 12/1996 | Levi et al. | 364/450 |
| 5,629,626 | 5/1997 | Russell et al. | 324/345 |
| 5,633,799 | 5/1997 | Dussell | 364/449.9 |
| 5,645,077 | 7/1997 | Foxlin | 128/774 |
| 5,671,160 | 9/1997 | Julian | 364/559 |
| 5,699,244 | 12/1997 | Clark, Jr. et al. | 364/420 |
| 5,711,388 | 1/1998 | Davies et al. | 180/168 |
| 5,726,660 | 3/1998 | Purdy et al. | 342/357 |
| 5,736,923 | 4/1998 | Saab | 340/429 |
| 5,742,923 | 4/1998 | Odagawa | 701/207 |
| 5,774,832 | 6/1998 | Vanderwerf | 701/220 |
| 5,807,284 | 9/1998 | Foxlin | 600/595 |
| 5,819,206 | 10/1998 | Horton et al. | 702/150 |

OTHER PUBLICATIONS

Trimble Navigation Limited, "Trimble Land Survey Home Page", Internet Web Page at www.trimble.com/survey/, date unknown.

Hadfield, M.J., "High Precision Positioning and Gravity Measurement with Geo–Spin—An Update," Honeywell, Inc., Military Avionics Division. (date unknown).

*Primary Examiner*—Patrick Assouad
*Attorney, Agent, or Firm*—Lappin & Kusmer LLP

[57] ABSTRACT

A personal inertial surveying system includes an inertial sensor and processing equipment adapted to be mounted to or carried by a person walking through a region being surveyed. As the person walks inaccuracies in position measurement due to drifts in the inertial sensor can be conveniently corrected. Corrections can be performed often during brief pauses as the person paces though the region, resulting in improved accuracy in the survey.

38 Claims, 4 Drawing Sheets

PERSONAL INERTIAL SURVEYING SYSTEM

BACKGROUND OF THE INVENTION

Typical inertial systems operate by integrating the outputs of a set of three-axis gyroscopes and accelerometers to obtain attitude and position information of a platform in inertial space. These inertial elements have random drift and other errors which can increase rapidly over time and, as a result, introduce substantial error into the position measurement. To prevent build-up of these errors, a zero update stop (ZUPTS) procedure may be performed periodically to reset velocities, to perform position correction and to correct sensor attitude using the vertical gravity vector and earth rotation speed as references. In general, the accuracy of the measurement is directly related to the frequency of ZUPTS, that is, as the frequency of ZUPTS increases, so does the accuracy of the sensor. To perform a ZUPTS, the inertial platform is brought to rest and sensor velocity readings are zeroed to eliminate velocity error. Also, position error corrections, based on velocity error, can be made. At the same time, attitude adjustment can be performed by comparing the sensor angular measurement with the known gravitational vertical vector. The difference between the two is zeroed to eliminate angular or attitude measurement error. Adjustments can also be made referenced to the speed of rotation of the earth. When the ZUPTS is completed, the sensor can again be moved to begin inertial measurements.

Another form of error correction involves performance of a coordinate update stop (CUPTS) in which position coordinates are updated according to actual known position. In performing a CUPTS, the sensor can be brought to rest at a known position, such as a geodesic marker fixed to the ground. CUPTS can also be performed by receiving position coordinates from a global position satellite (GPS) system.

Inertial systems have been used in surveying systems to provide surveys of large areas of land. Such systems are typically mounted in a motor vehicle or helicopter and are moved over the land being surveyed. To perform a ZUPTS or CUPTS in such systems, the vehicle must be temporarily stopped or the helicopter must be landed on the ground while velocity and angular errors are zeroed. Where large areas are being surveyed, these stops can be inconvenient since they can add considerable time to the procedure. As a result, in such systems, ZUPTS and/or CUPTS are performed infrequently. Since sensor error is dependent on time, this infrequent rate of error correction can introduce substantial errors into the survey. Thus, due to the inconvenience of performing frequent ZUPTS and/or CUPTS, in these prior vehicle-mounted systems, accuracy of position and angular measurement is sacrificed.

SUMMARY OF THE INVENTION

The present invention is directed to a system and method for inertial surveying which substantially eliminates the problems in the prior art systems. Specifically, the system of the invention is adapted to be mounted to or worn, carried or wheeled by a person walking through the region being surveyed. The personal surveying system (PSS) of the invention includes an inertial sensor coupled to the person such as by being carried or worn by the person. The inertial sensor detects motion as the person walks through the region and generates a signal indicative of the motion of the inertial sensor. A processing means such as a computer, which can also be coupled to the person, receives the signal indicative of sensor motion and processes the signal to generate a second signal indicative of position of the sensor. Position information generated by the processor is stored in memory. To eliminate position error, the system includes means for correcting the position information stored in the memory to eliminate inaccuracies in the position information. This means for correcting the position information can be, for example, a means for performing periodic ZUPTS and/or CUPTS, and it can be activated by the person as the person walks through the region being surveyed.

In one embodiment, the inertial sensor and processor electronics are provided in separate enclosures. For example, the inertial sensor can be an inertial measurement unit (IMU) including three-axis gyroscopes and accelerometers contained in a first enclosure, and the processing electronics can be contained in a second enclosure. The sensor can be mounted to the person such as by being strapped or clipped to the person's shoe or boot. The processing electronics can be contained in a pack strapped to the person's back. In this case, the enclosures are connected by cables. In one particular embodiment, a fiber optic cable is used to couple the enclosures.

In one embodiment, the system can correct system information by performing CUPTS during which sensor motion is stopped while actual position information is obtained. In one embodiment, the CUPTS involves contacting the sensor to a permanent marker such as a geodesic reference marker on or under the ground. Since these markers have known position on the earth, the inertial sensor can be brought into contact with the marker and the position can be logged into the system, such as by the operator operating an input switch. In a case where the geodesic reference marker is underground, the system can include a protrusion which can penetrate the ground to contact the marker.

The system can also include a global position satellite (GPS) system antennae interface such that actual position coordinates can be input regularly into the system. In one embodiment, GPS inputs are used periodically to eliminate position errors. In another embodiment, GPS inputs are used continuously such that ZUPTS need not be performed.

In one embodiment, the inertial sensor can be mounted to a cane carried by the person as the person walks through the region being surveyed. The cane can include an actuation device such as a pushbutton switch which the person uses to initiate ZUPTS and/or CUPTS. In another embodiment, the sensor can be mounted to the person's foot. In this case, ZUPTS and/or CUPTS can be activated by the person pressing a switch in the person's boot, such as by pressing heels together or by pressing a single heel into the ground.

In either the cane-mounted or foot-mounted configuration, activation of ZUPTS and/or CUPTS is conveniently performed by the person. While walking, the foot is naturally brought to a stationary or rest position with each step. The cane can also be carried in such a manner that the cane is at rest for each pace. In either case, the sensor can be conveniently held at rest while a correction is performmned.

The system of the invention can also provide elevational measurements such that a topographic contour of the region can be provided. In addition, the system can be configured with the capability for voice input such that as the contour profile is generated, the person can identify various landmarks in the region by providing voice input to a synchronized audio recording. For example, the person can identify a particular tree in proximity to an elevational variation to make the land contour profile more comprehensive. The voice input facility can also be used as a means for activating ZUPTS and/or CUPTS. That is, instead of the user pressing a button or clicking heels together, the user can speak into a microphone to activate a correction.

The system of the invention can also be used to measure distances to remote objects. In one embodiment, the inertial sensor can be equipped with a sighting scope which can be used to provide precise angular measurement to a distant object from two points along a baseline. The length of the baseline can then be determined by pacing it off by using the sensor of the invention. The baseline length measured by the sensor as well as the angular measurements to the distant object can be used to compute the distance to the object.

The personal inertial surveying system and method of the invention provide numerous advantages over the prior art systems. For example, since it is a portable personally-mounted system, ZUPTS and/or CUPTS can be conveniently performed by the person as the person walks through the region. Since corrections are more convenient, they can be performed more often such that the accuracy of the system is improved over the vehicle-mounted systems of the prior art, in which performance of correction is inconvenient and time-consuming.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
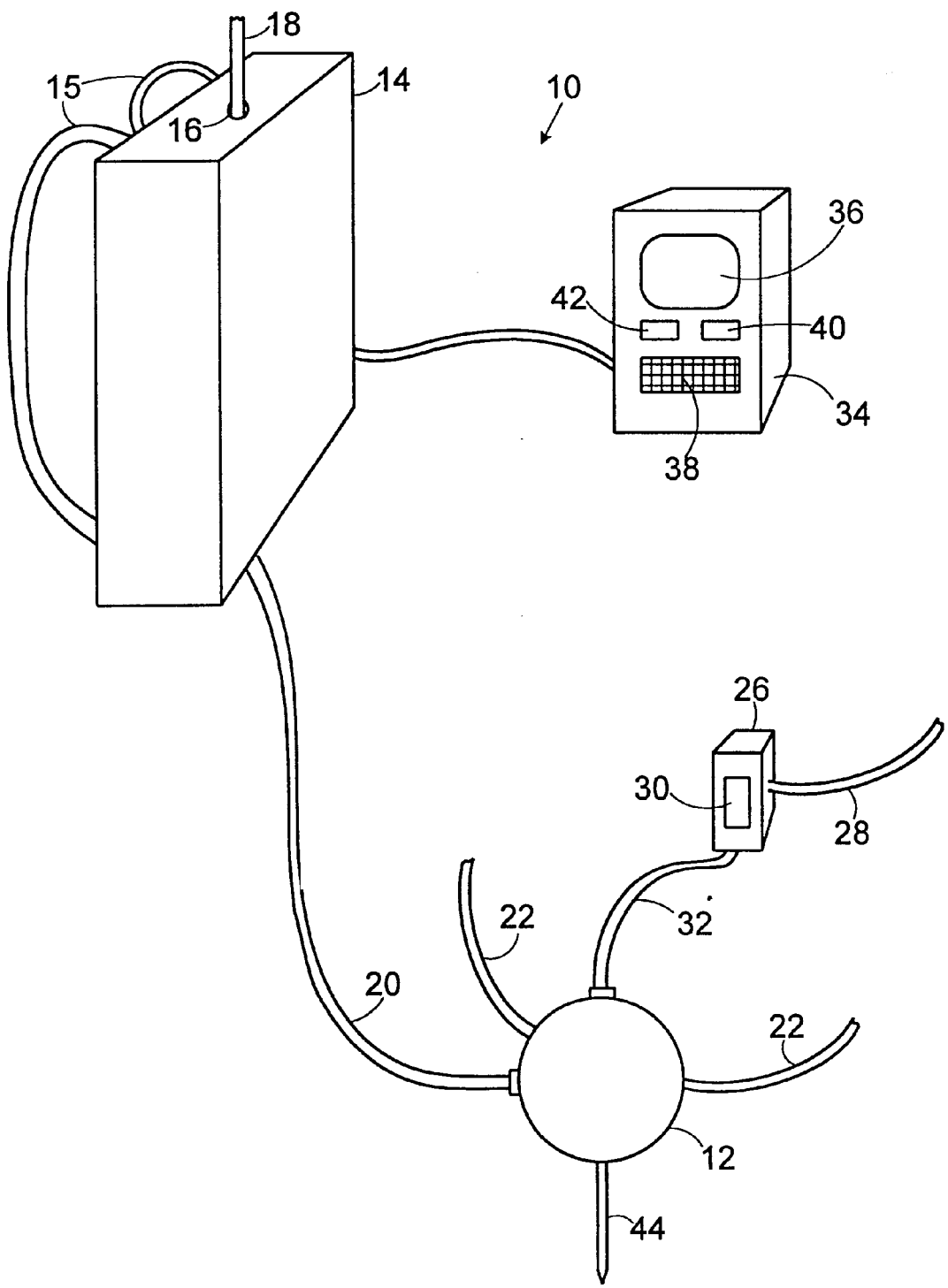
FIG. 1 is a schematic pictorial view of one embodiment of the personal inertial surveying system of the invention.

FIG. 1 is a schematic view of the personal inertial surveying system 10 of the invention. As shown, the system 10 can include a first enclosure 14 which can be in the form of a backpack worn on the back of the user with the aid of shoulder straps 15. The enclosure 14 includes processing electronics, interface circuitry, battery, power supply and other electronics required for operation of the system 10. The enclosure 14 can also include an antenna interface 16 for connection to a GPS antenna 18.

Figure 2:
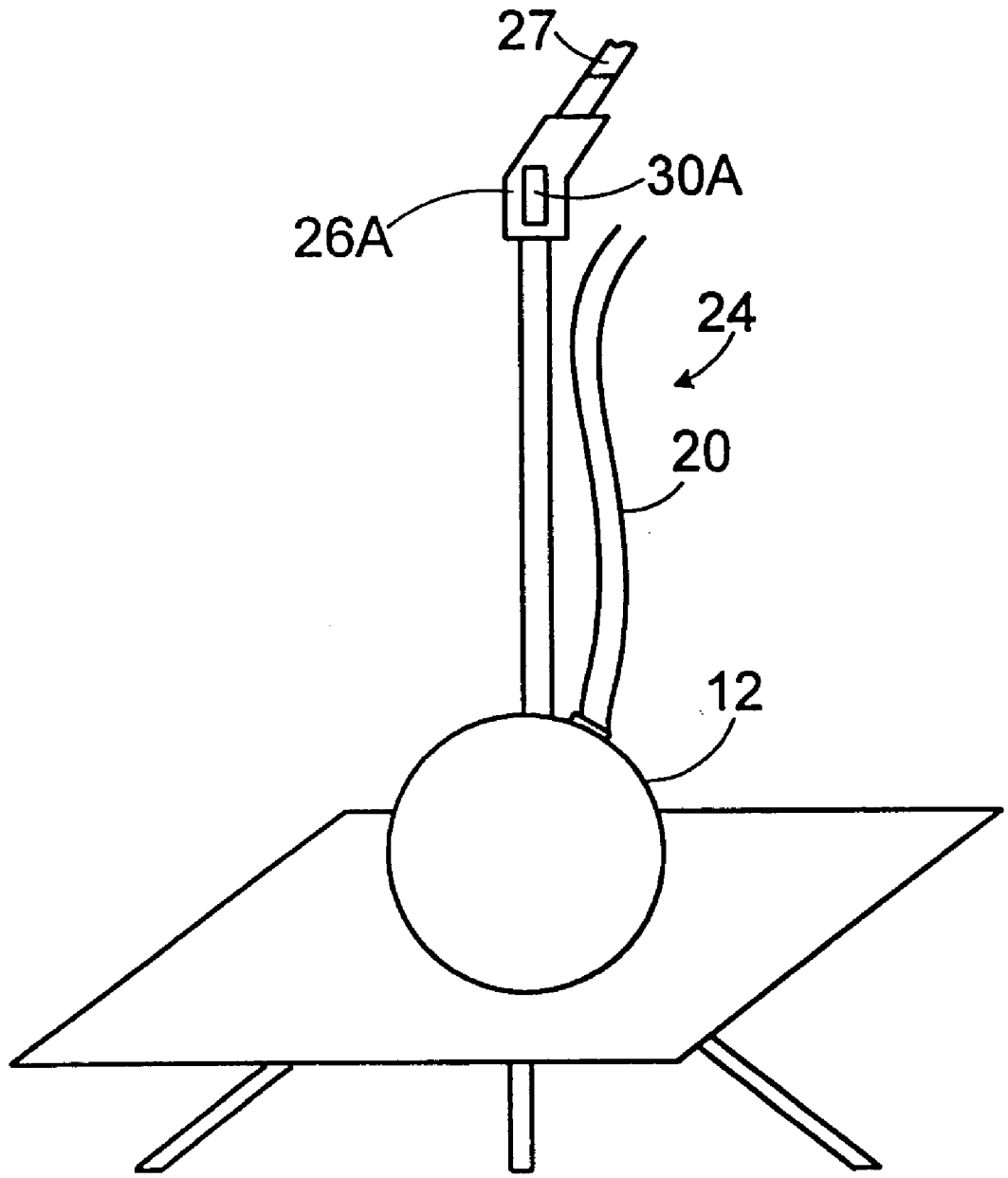
FIG. 2 is a schematic pictorial view of a cane-mounted inertial sensor in accordance with the present invention.

The system 10 also includes an inertial sensor 12 such as an inertial measurement unit (IMU), which can include inertial measuring devices such as three-axis accelerometers and/or gyroscopes. The gyroscopes can be fiber optic gyroscopes and the sensor 12 can be connected to the backpack enclosure 14 by a cable 20 which can include a fiber optic conductor. In a preferred embodiment, the inertial sensor 12 is adapted to be coupled to the user or person performing a survey. To that end, straps 22 can be provided on the inertial sensor 12 to allow the user to attach the inertial sensor 12 to his/her shoe or boot. Alternatively, as shown in FIG. 2, the inertial sensor 12 can be attached to a cane 24 which is carried by the user as the user walks through the region being surveyed.

Referring again to FIG. 1, the system 10 can also include an actuation member 26 which is used by the surveyor to actuate corrections such as ZUPTS and/or CUPTS as the survey is performed. The actuation member can include a device such as a switch 30 which is actuated by the surveyor to initiate the correction. The actuation 26 can also include a means such as straps 28 for attaching it to the surveyor. The surveyor can attach the device 26 to his/her boot such that, when a correction is to be performed, the user can click heels together or press a heel to the ground to activate switch 30. The device 26 is coupled to the system electrically by a cable 32 which is shown connected to the inertial sensor 12. However, it will be appreciated that the cable 32 can also be combined with cable 20 and connected directly to the electronics contained within enclosure 14.

The system 10 of the invention can also include an optional hand-held unit 34 which allows the surveyor to communicate with the system. For example, the hand-held unit can include a display 36 which can display position, velocity or angular orientation updates and other information such as command feedback. The hand-held unit 34 can also include a keypad 38 to allow the user to enter commands and information pertinent to the survey being performed. For example, the keypad 38 can allow the user to input landmarks as the survey is being performed. A speaker 42 can also be included to provide audio feedback to the user such as a beep when a correction is completed to inform the user that the survey can proceed. A microphone 40 can also be included to provide for voice input from the user to a synchronized audio recording. In this way, as the survey is being performed, the user can verbally identify landmarks to make the survey more complete. This facility can be useful when preparing a contour map of a region with audio recording playback to identify landmarks.

The inertial sensor 12 can also include a retractable protrusion 44 used to contact position reference markers such as geodesic markers on or under the surface of the ground being surveyed. A position update can be obtained for this system by contacting the marker which is of known position. A CUPTS can then be performed to update the actual position information stored in the system. Since the reference marker can be buried beneath the surface of the ground, the rod or protrusion 44 is extendable such that it can be inserted into the ground to contact the marker.

Referring to FIG. 2, as mentioned above, the inertial sensor 12 need not be attached to the user. Instead, it can be mounted to a cane 24 which is carried by the user as the survey is performed. As the user walks through the region being surveyed, the cane is carried by the user and stepped along next to the user. Alternatively, the cane can include one or more wheels such that it can be wheeled through the region by the user, instead of carried. To perform a correction, the user can temporarily stop walking and hold the cane 24 in a stationary position on the ground. The activation device 26A is mounted to the handle 27 of the cane 24. The device 26A can be used as described above to initiate a correction such as by pressing a switch 30A on the device 26A.

Figure 3:
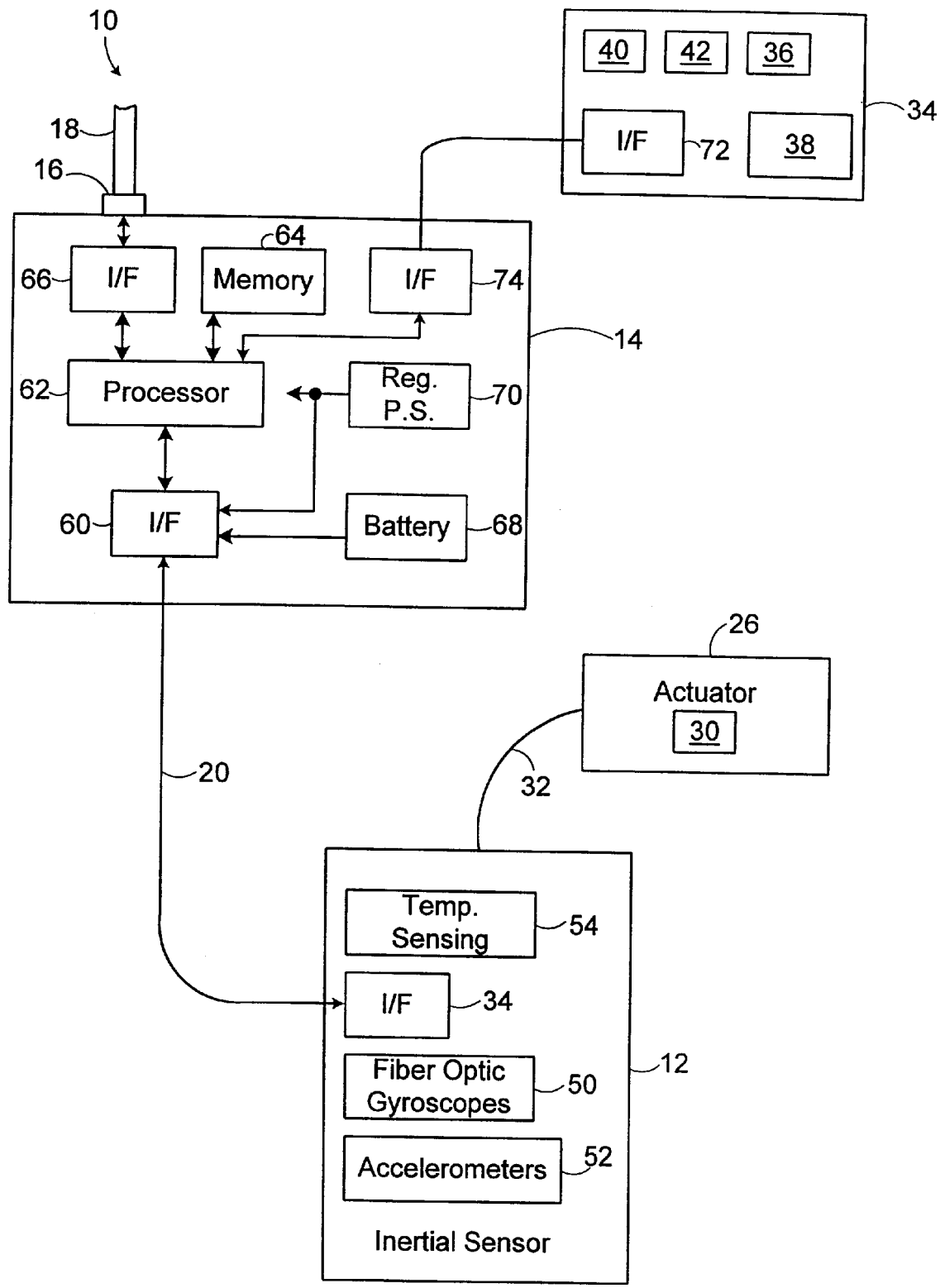
FIG. 3 is a schematic block diagram of the circuitry of one embodiment of the personal inertial surveying system of the invention.

FIG. 3 is a schematic block diagram of the system 10 of the invention. As shown in FIG. 3, the system includes the inertial sensor 12 coupled through an interface 53 to processing electronics 14 by a cable 20. The inertial sensor 12 preferably includes three-axis gyroscopes 50, which can be fiber optic gyroscopes, and accelerometers 52. In general, the inertial sensor 12 can be an inertial measurement unit (IMU) and can include accelerometers such as a QA-2000 accelerometer provided by Allied Signal Incorporated or an ADXL05 accelerometer manufactured by Analog Devices of Norwood, Mass. The gyroscopes can be fiber optic gyroscopes such as, for example, those manufactured by by Fibersense Technology Corporation of Norwood, Mass. or by Andrew Corporation of Orland Park, Ill.

The sensor 12 can also include temperature sensors, generally referred to as 54. The temperature sensors sense temperature throughout the sensor 12 such as at the surface of the sensor 12 as well as near the gyroscopes 50 and accelerometers 52. Temperature readings are transmitted to the processing circuitry 14 such that the readings can be used to perform temperature compensation to eliminate errors in the measurement due to temperature effects.

FIG. 3 also shows the actuation device 26 coupled by cable 32 to inertial sensor 12. Switch 30 is used by the surveyor to send a signal along line 32 to the processing electronics 14 to initiate a correction such as a ZUPTS or CUPTS.

The processing electronics 14 include an interface 60 which transmits and receives signals along the cable 20 to and from the inertial sensor 12. Electronics 14 also include a processor 62 and associated memory 64. Instructions and data stored in memory 64 are used in processor 62 to carry out the functional operations of the sensor of the invention. Signals are coupled between the processor 62 and inertial sensor 12 via the interface 60.

The processing electronics 14 can also include a GPS interface 66 which provides a GPS signal interface via GPS antenna connector 16 to a GPS antenna 18. GPS location signals are used in the present invention to correct and update the position reading of the sensor. In one embodiment, GPS positioning can be used continuously without the need for periodic ZUPTS. In cases where GPS is not used, such as in urban areas where GPS signals are blocked by buildings, ZUPTS can be used to remove position error from the system. ZUPTS can also be used to correct position readings during outages of GPS signals. Alternatively, GPS can be used to update position coordinates periodically during a survey to compliment position readings obtained by the inertial sensor. In this case, ZUPTS are used along with CUPTS using GPS positioning.

The processing electronics 14 can also include a battery 68 which provides all of the power for the system such that the system 10 is completely portable. The battery 68 can be used to drive a regulated DC power supply 70 which provides regulated DC power to the remaining electronics. Battery power and/or regulated power can be provided to the inertial sensor 12 via cable 20.

The hand-held unit 34 is coupled to the electronics 14 across an interface 72 within the unit 34 and a corresponding interface 74 in the electronics unit 14. As mentioned above, the hand-held unit 34 can include a display 36, a speaker 42, a microphone 40 and a keypad 38 to provide a complete user interface.

In another embodiment, the system 10 of the invention can be used to determine distance to a remote object by triangulation. In this embodiment, the system 10 is used to determine the length of a baseline and also the angular direction to the object from opposite ends of the baseline. Knowing the length of the baseline and the two angular directions allows for triangulation computation of the distance to the object.

Figure 4:
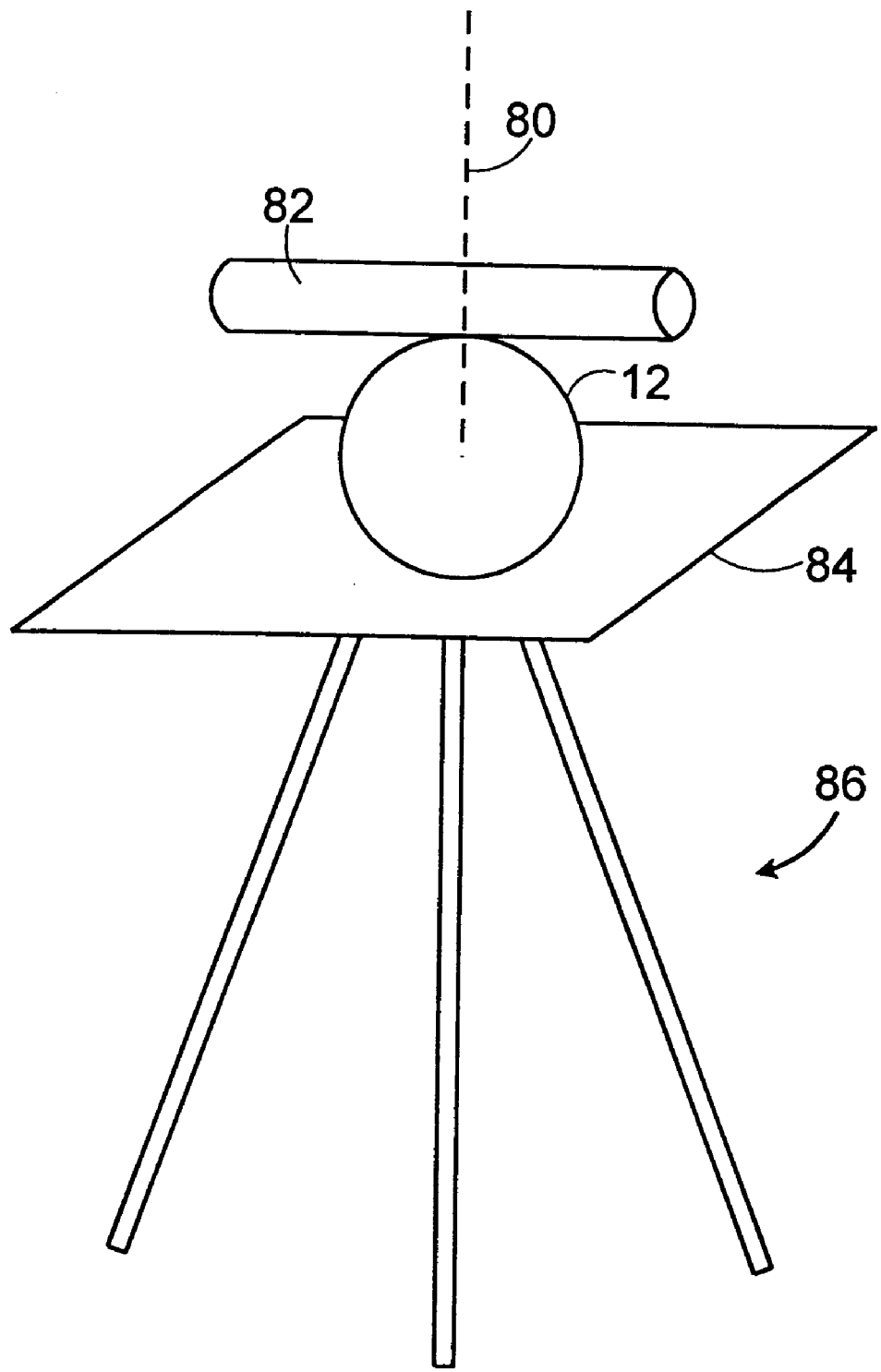
FIG. 4 is a schematic pictorial view of the inertial sensor of the invention mounted with a sighting scope to provide distance information in accordance with the present invention.

FIG. 4 is a schematic pictorial diagram showing an embodiment of the inertial sensor 12 of the system 10 of the invention adapted to perform the angular measurements for triangulation. In this embodiment, the inertial sensor 12 is fitted with a sighting scope 82 and is mounted on a platform 84 which is supported by a tripod base 86. The tripod base 86 is placed on the baseline and a distant object is sighted through the sighting scope 82. The inertial sensor 12 and sighting scope 82 are rotatable about the vertical axis 80, and the angle of rotation is measured by the inertial sensor 12. The inertial sensor 12 can be rotated in two axes, namely, it can be rotated about the vertical axis 80 and it can also be rotated to change its elevation such that objects of different heights can be sighted. These angular measurements are taken at two ends of the baseline, and the system 10 is used to determine the length of the baseline by walking off of the baseline with the inertial sensor 12 and processing electronics 14 as described above. The system can thus be used to provide an accurate measure of the distance to the object.

As described above, the use of frequent ZUPTS in the present invention makes it extremely accurate for surveying a region. In one embodiment, where ZUPTS are performed every ten seconds, centimeter accuracy is obtained.

Various usage configurations for the personal surveying system of the invention are possible. For example, it can be operated in conjunction with a GPS system as described above. The combined personal surveying system (PSS) and GPS system provides for position smoothing and multipath rejection and also accomplishes interpolation between GPS gaps and also provides for bridging of longer gaps at sites that do not clearly receive a full set of GPS satellites. The system can be carried by user at walking speed. In this usage, the PSS portion of the integrated PSS/GPS system is effectively continuously calibrated as long as a full set of GPS satellites are in view and the PSS and GPS system remain attached. When satellites are out of view or when the GPS system is not present, such as when measurements are being taken in the shadow of buildings or in forested areas, system accuracy is maintained. Also, for long satellite tracking gaps, the PSS position data allows rapid GPS recovery without carrier cycle ambiguity error.

In the combined PSS/GPS system, ZUPTS are not necessary when the GPS system is continuously calibrating the PSS system. However, when satellites are obscured for a significant interval, the ZUPTS procedure should be started and continued to maintain the PSS accuracy. The ZUPTS interval should be made commensurate with the expected outage time. Thus, if centimeter accurate readings are to be taken, a short ZUPTS interval should be used. If no readings are required, but it is desirable to proceed to another point and quickly reacquire GPS, a longer ZUPTS interval is acceptable, depending upon the expected GPS gap. It should be noted that in a wide lane dual-frequency GPS system, as much as 40 cm of PSS error may accumulate and still permit re-acquisition without ambiguity. In this case, longer ZUPTS intervals are acceptable.

In another configuration, the PSS operates as a stand-alone system. This configuration can be used at sites where GPS is not useful such as indoors, underground, in urban areas or in heavily wooded areas. In this configuration, the system is mounted to the user and operated at walking speed with a short ZUPTS interval which is compatible with the rhythm of walking. Either mounting the system to the user or the cane-mounted configuration are therefore usable in this situation.

A stand-alone system can be used to perform high-density surveys of compact sites. One procedure for this is to quickly establish a small number, e.g., 2–4, reference points evenly distributed on the site and to return to these points as often as is convenient, so as to close short traverses. Using this technique as an appropriate ZUPTS interval, centimeter-level accuracies can be obtained routinely.

An example approach to a stand-alone system survey could proceed as follows:

1. To begin the survey, first establish a master reference point on the site by transporting the PSS system to that point from an accurately known location, making use of a transport vehicle if the distance is long and using a short ZUPTS interval.

2. Using the PSS system, establishing a network of evenly distributed secondary reference points on the site, e.g., three secondary points, each within a small number, e.g., three, of short ZUPTS intervals from the master reference point.

3. Use the system to take measurements at other points as needed in the survey, using a short ZUPTS interval and returning the PSS system to a primary or to a secondary reference point when convenient, i.e., on the way or nearby the way in between points, and during breaks or at least after five minutes, for example. In one embodiment, the primary and secondary reference points can be marked by reference markers placed by the surveyor. Upon return to the reference point, the reference marker can be contacted to update/correct the present position information. In one embodiment, contact with the marker polls the marker to identify itself to the system of the invention. This can be accomplished by a wireless link between the marker and the system of the invention. Each marker can be assigned its own unique label, e.g., "Marker #1," associated with its actual position such that when it identifies itself to the system by its label, position correction can be accomplished.

4. At the end of the survey, a reverse transit of the PSS system from the master reference point back to the known location may be performed to increase the absolute geodetic accuracy of the entire survey.

While this invention has been particularly shown and described with references to preferred embodiments thereof, it will be understood by those skilled in the art that various changes in form and details may be made therein without departing from the spirit and scope of the invention as defined in the following claims.

What is claimed is:

1. A personal inertial surveying system comprising:
   an inertial sensor adapted to be coupled to a person, the inertial sensor detecting motion of the inertial sensor as the person walks through a region and generating a first signal indicative of the motion of the inertial sensor;
   processing means adapted to be coupled to the person for receiving the first signal indicative of the motion of the inertial sensor and generating therefrom a second signal indicative of a position of the inertial sensor;
   a memory for storing position information related to the position of the inertial sensor;
   means for correcting the position information stored in the memory to correct for inaccuracies in the position information; and
   means for activating the means for correcting the position information, said means for activating being coupled to signals generated by the person as the person walks through the region.

2. The system of claim 1 wherein the sensor is contained within a first enclosure and at least a portion of the processing means is contained within a second enclosure.

3. The system of claim 2 further comprising a fiber optic cable coupling the first and second enclosures.

4. The system of claim 1 further comprising a protrusion insertable into the ground to contact a subterranean marker for logging the position of the subterranean marker.

5. The system of claim 1 further comprising a protrusion for contacting a marker on the surface of the ground for logging the position of the marker.

6. The system of claim 1 further comprising a means for contacting a reference position marker for logging the position of the reference position marker.

7. The system of claim 1 wherein the means for activating the means for correcting the position information is mounted on a cane, said cane being adapted to be carried by the person.

8. The system of claim 1 wherein the means for activating the means for correcting the position information is mountable on footwear worn by the person.

9. The system of claim 1 further comprising an antenna interface for global positioning satellite (GPS) system communication.

10. The system of claim 1 wherein the second signal indicative of a position of the inertial sensor is indicative of angular orientation of the inertial sensor.

11. The system of claim 1 wherein the position information stored in memory related to the position of the inertial sensor is related to the angular orientation of the inertial sensor.

12. The system of claim 1 wherein the inertial sensor comprises an accelerometer.

13. The system of claim 12 wherein the inaccuracies in the position information are at least partly due to drift in the accelerometer over time.

14. The system of claim 1 wherein the inertial sensor comprises a gyroscope.

15. The system of claim 14 wherein the gyroscope is a fiber optic gyroscope.

16. The system of claim 15 wherein the inaccuracies in the position information are at least partly due to drift in the gyroscope over time.

17. The method of claim 1 wherein the inaccuracies in the position information are at least partly due to drift in the inertial sensor over time.

18. The system of claim 1 wherein the means for correcting the position information provides a zero-velocity update stop (ZUPTS) calibration while the inertial sensor is assumed to be stationary.

19. The system of claim 1 wherein the means for correcting the position information provides an angular orientation calibration while the inertial sensor is assumed to be stationary.

20. The system of claim 1 wherein the means for correcting the position information provides a vertical orientation calibration while the inertial sensor is assumed to be stationary.

21. The system of claim 1 wherein the inertial sensor comprises a three-axis inertial system.

22. The system of claim 1 further comprising a sighting scope coupled to the inertial sensor for sighting an object to determine an angular measurement to the object.

23. A method of surveying a region comprising:
   coupling an inertial sensor to a person;
   with the inertial sensor, detecting motion of the inertial sensor as the person walks through the region;
   with the inertial sensor, generating a first signal indicative of the motion of the inertial sensor;
   using the first signal indicative of the motion of the inertial sensor, generating a second signal indicative of position of the inertial sensor;
   storing position information related to the position of the inertial sensor; and correcting the position information to correct for inaccuracies in the position information, said correcting being controlled by signals generated by the person as the person walks through the region.

24. The method of claim 23 further comprising:

containing the inertial sensor within a first enclosure coupled to the person; and containing a processor within a second enclosure coupled to the person.

25. The method of claim 24 further comprising coupling the first enclosure to the second enclosure with a fiber optic cable.

26. The method of claim 24 further comprising providing a protrusion insertable into the ground for contacting a subterranean marker to log the position of the subterranean marker.

27. The method of claim 24 further comprising providing a protrusion for contacting a marker on the surface of the ground for logging the position of the marker.

28. The method of claim 24 further comprising contacting a reference position marker to log the position of the reference position marker.

29. The method of claim 24 further comprising providing an actuator on a cane, said cane being adapted to be carried by the person, the person using the actuator to generate the signals to control the correcting step.

30. The method of claim 24 further comprising providing an actuator to generate the signals to control the correcting step, said actuator being adapted to be worn by the person.

31. The method of claim 30 wherein the actuator is adapted to be coupled to footwear worn by the person.

32. The method of claim 24 further comprising providing an antenna interface for global positioning satellite (GPS) system communication.

33. The method of claim 24 wherein the second signal indicative of position of the sensor is indicative of angular orientation of the inertial sensor.

34. The method of claim 24 wherein the stored position information is related to angular orientation of the inertial sensor.

35. The method of claim 24 wherein the inaccuracies in the position information are at least partly due to drift in the inertial sensor over time.

36. The method of claim 24 wherein correcting the information comprises performing a zero-velocity update stop (ZUPT) calibration while the inertial sensor is assumed to be stationary.

37. The method of claim 24 wherein correcting the information comprises performing an angular orientation calibration while the inertial sensor is assumed to be stationary.

38. The method of claim 24 wherein correcting the information comprises performing a vertical orientation calibration while the inertial sensor is assumed to be stationary.

* * * * *